1

3,284,425
CONVERSION OF POLYMETHACRYLATE TO POLYMETHACRYLIMIDE IN AN AQUEOUS SYSTEM
Günter Schröder, Darmstadt, Germany, and Klaus Tessmar, deceased, late of Darmstadt, Germany, by Ruth Helene Tessmar, widow and sole heir, Darmstadt, Germany, assignors to Rohm & Haas G.m.b.H., Darmstadt, Germany
No Drawing. Filed May 15, 1964, Ser. No. 368,452
Claims priority, application Germany, Mar. 26, 1959, R 25,227
6 Claims. (Cl. 260—89.5)

This application is a continuation-in-part of application Serial No. 16,656 filed March 22, 1960, now abandoned.

This invention relates to nitrogenous derivatives of polymethacrylate, and to methods of making the same, and relates in particular to polymethacrylimide polymers and methods of making the same.

U.S. Patent 2,146,209 to Graves teaches methods for producing polymethacrylimide materials by the treatment of polymethylmethacrylate with amines and/or ammonia. The reaction is performed in the presence or absence of organic solvents, and a small amount of water may be employed as a catalyst.

P. J. Flory has statistically analyzed the cyclization reaction occurring in this imide formation in J. Am. Chem. Soc. 61, 1518–1521 (1939), and has shown that a maximum of about 86 percent of the carboxyl (ester) groups of an acrylic (acrylate) polymer will participate in imide formation. As will be pointed out hereinafter, the reactions reported in the Graves patent by way of example experimentally corroborate these calculations.

According to the present invention, polymethacrylate homopolymers and copolymers are treated with dilute aqueous solutions of amines, alone or together with ammonia. Surprisingly, in the presence of relatively large amounts of water, polymethacrylimide products are formed which are substantially free of carboxy or ester groups, i.e. in which the degree of imidization is at least about 95 percent, a figure in excess of both the theoretical calculated maximum and the maximum experimentally found by Graves. Because of the scarcity of carboxy groups in the products prepared by the present invention, the materials are more highly resistant to alkali than those produced by prior art processes.

Although the applicants do not know the cause for this higher degree of imidization, it is possible that, in the presence of large amounts of water and under the reaction conditions prevailing, the imide groups first formed by the reaction of the invention are in dynamic equilibrium with non-cyclic species. That is, rather than being temporally and spatially fixed on the polymer molecule, the imide rings continually open and close and wander along the polymer until substantially all of the groups capable of imidization have been imidized. Where such an equilibrium is not possible, a single acid or ester group may become isolated between adjacent imide rings, as was envisioned by Flory in the aforementioned article, resulting in a lower overall degree of imidization.

Aqueous solutions of aliphatic, heterocyclic, and araliphatic amines having two hydrogen atoms on the amine nitrogen atom can be used in practicing the present invention. Exemplary of such materials are amines such as n-decyl amine, n-dodecyl amine, n-cetyl amine, and n-octadecyl amine.

The amines are employed as aqueous solutions containing between about 1 percent by weight and 30 percent by weight of amine. If aqueous ammoniacal solutions of the amines are used, the solutions may additionally contain up to about 10 percent by weight of ammonia. Suitably, sufficient solution is used so that an amount of amine, or of amine and ammonia, is present which is at least equivalent to the imide forming groups of the polymer being treated.

The polymers being treated are heated with these aqueous solutions at temperatures of between 180° C. and 300° C. The reaction is commonly carried out in an autoclave under autogenous pressure which varies with the temperature used and the amount and concentration of amine present. In general, pressures between about 8 and about 85 atmospheres, suitably from about 8 to 40 atmospheres, are preferred during treatment, but the pressures are not critical. The treatment may vary in duration from ½ hour to 7 hours, depending on the degree of conversion desired, the temperature used, and the amount and concentration of amine, for example. Such considerations are common to all chemical reactions and are within the skill of the art.

The invention is particularly useful when applied to homopolymers of methylmethacrylate, but copolymers of methylmethacrylate with methacrylic acid and/or with one or more methacrylic acid derivatives such as methacrylonitrile, methacrylamide, N-lower alkyl methacrylamides such as N-methyl, N-ethyl, N-propyl, and N-butyl methacrylamides, methacrylic acid chloride, or ammonium methacrylate can also be treated. These comonomeric materials, present in a copolymer with methylmethacrylate, will imidize under the reaction conditions to form the polymethacrylimide polymers of the invention. One or more of these comonomeric materials may be present, with methylmethacrylate, in amounts up to 90 percent by weight of the polymer treated. Particularly convenient starting materials are homopolymers of methylmethacrylate, as mentioned, or copolymers of this material with from about 10 up to about 50 percent by weight of one or more of the comonomers mentioned earlier.

The treatment of methylmethacrylate homopolymers and copolymers with an aqueous solution of a primary amine gives products which, in contrast to the products obtained in the prior art, are extremely difficult to hydrolyze. When hydrolysis is accomplished under strenuous conditions such as high temperature and strongly alkaline media, the products obtained, when used as soil conditioners, are characterized by an especially high persistence and an effectiveness extending for a period of several years.

The products obtained by treating methylmethacrylate homopolymers and copolymers with an aqueous solution of primary amines according to the invention are water-insoluble and alkali-resistant, but can be dissolved in suitable solvents, for example in a mixture of dimethyl formamide and formic acid, and can then be used for the production of polymer films according to methods known to the art. As another possibility, dried products obtained according to the process can be pressed. The films, as well as the pressed products, are characterized by a high resistance to deformation by heat even at temperatures higher than 200° C., and notably exceed the behavior of the polymethylmethacrylate starting products in this respect.

In accordance with a preferred embodiment of the invention, products which are particularly readily susceptible to filtration are obtained when polymethylmethacrylate is treated with primary and/or secondary amines in an aqueous solution of an electrolyte, for example, calcium chloride or ammonium sulfate.

The advantages and utility of the method of the invention will be further apparent from the following examples which illustrate typical specific methods within the scope of the invention and set forth the best modes now contemplated of practicing the invention. It is to be understood that these examples are illustrative only and that numerous changes can be made in the materials, preparations and conditions described without departing from the invention. The parts are by weight unless specified otherwise.

*Example 1*

120 grams of rough milled polymethylmethacrylate were heated for 7 hours at 230° C. in a tubular autoclave with 192 grams of a 33⅓ percent aqueous solution of methylamine and 780 grams of water. A pressure between about 30 atmospheres and 36 atmospheres was maintained. The reaction product comprised a watery phase and a polymer phase insoluble in water, aqueous ammonia, and most organic solvents. The solid product had a nitrogen content of 8.4 percent and a —$OCH_3$ content of 0.2 percent. The product is extraordinarily resistant to aqueous alkali. For example, it is not attacked by immersion at 90° C. in a 10 percent sodium hydroxide solution for a period of 8 hours.

*Example 2*

120 grams of granulated polymethylmethacrylate were heated at 270° C., with stirring, for 7 hours in a stainless steel autoclave with 149 grams of butyl amine and 910 grams of water. A maximum pressure of 55 atmospheres was attained.

After cooling, a solid, yellow-white mass insoluble in water and in dilute ammonia was obtained. This mass was dissolved in dimethyl formamide. By drying the solution, a glass-clear colorless film of poly-N-butyl methacrylimide was obtained. By analysis, the polymer had a methoxy group content of 0.3 percent, which corresponds with 1 percent by weight of unreacted methylmethacrylate units. Determination of the acid number gave a carboxyl group content of 0.6 percent.

Elemental analysis gave the following values:

|   | Percent Found | Percent Calculated for Poly-N-butyl-methacryl-imide |
|---|---|---|
| C | 68.9 | 69.0 |
| H | 9.1 | 9.1 |
| N | 6.4 | 6.7 |

*Example 3*

250 grams of a coarsely divided copolymer containing 60 percent by weight of methylmethacrylate and 40 percent by weight of N-methylmethacrylamide were heated with stirring in a stainless steel autoclave for 4 hours at 250° C. with 500 grams of a 6 percent aqueous solution of methyl amine. The reaction product is a yellow-white water-insoluble mass which, after drying, was pressed into a test plate. The resistance of this material to deformation by heat according to the method of Vicat was 173° C. The nitrogen content was 8.4 percent (the calculated value for poly-N-methylmethacrylimide is 8.4 percent).

A determination of the acid number indicated 1.2 percent by weight of methacrylic acid units. Based on the methoxyl content, 1 percent by weight of methylmethacrylate units had not reacted.

*Example 4*

1 gram of a copolymer comprising 71.3 mol percent of methylmethacrylate and 28.7 mol percent of methacrylonitrile were heated for 7 hours at 270° C. in an autoclave with 0.75 gram of methyl amine and 5 grams of water. The reaction product had the same properties and gave the same elementary analysis as did the poly-N-methyl-methacrylimide of the previous example.

*Example 5*

35 grams of a copolymer comprising 55 mol percent of methylmethacrylate and 45 mol percent of N-isopropyl methacrylamide were heated for 4 hours in an autoclave at 270° C. with 500 grams of a 2 percent aqueous solution of isopropyl amine. The reaction product is a yellow-white mass insoluble in water and aqueous ammonia.

A methoxy group determination indicated the presence of 0.02 percent by weight of unreacted methylmethacrylate units. Determination of the acid number indicated 1.8 percent by weight of methacrylic acid units. The nitrogen content of the reaction product amounted to 7.0 percent (the calculated value for pure poly-N-isopropyl methacrylimide is 7.3 percent).

*Example 6*

In each of the products of the preceding examples, more imide-forming groups were reacted to form polymethacrylimide than the 86 percent calculated by Flory to be cyclized in reactions of this type. For purposes of comparison, the weight percent of imide and the degree of imide formation for the materials reported by Graves in Examples 4, 5, 6, 7, and 9 of U.S. 2,146,209 are tabulated below. The maximum mol percent of imide (degree of imidization) observed by Graves is 86, affirming Flory's theoretical analysis.

TABLE

| Example No. | Weight Percent Imide | Corresponding Mol Percent | |
|---|---|---|---|
| | | Imide | Comonomer |
| 4 | 50.5 dodecyl imide | 39 | 61% methylmethacrylate. |
| 5 | 68.8 cetyl imide | 55 | 45% methylmethacrylate. |
| 6 | 67.2 octodecyl imide | 50 | 50% methylmethacrylate. |
| 7 | 88 butyl imide | 86 | 14% methacrylic acid. |
| 9 | 86.5 dodecyl imide | 81 | 19% methylmethacrylate. |

Examples 2, 3, and 8 of Graves do not contain sufficient data for analysis. Example 1 of the Graves patent reports a polymer containing 8.71 percent of nitrogen. The conclusion, reached by Graves from this figure, that the polymer is primarily polymethacrylic acid imide appears incorrect. For example, the polymer is reported to be soluble in dilute ammonia, but polymethacrylic acid imide is known to be insoluble in ammonia. While the nitrogen analysis is probably correct, the product obtained is most likely a copolymer consisting in part of methacrylimide, of methacrylamide, and of ammonium methacrylate.

What is claimed is:

1. The method of making water-insoluble alkali-resistant polymethacrylimides which are substantially free of carboxy groups and wherein the degree of imidization of said polymethacrylimides is at least 95 percent, which method comprises heating, at a temperature between about 180° C. and 300° C. and at a pressure of about 8 to about 85 atmospheres, a member selected from the group consisting of homopolymers of methyl methacrylate and copolymers of methyl methacrylate with up to 90 percent by weight of a comonomer selected from the group consisting of methacrylic acid, methacrylonitrile, methacrylamide, methacrylamides of primary lower alkyl monoamines having 1 to 4 carbon atoms, methacrylic acid chloride, and ammonium methacrylate, with an aqueous solution containing from about 1 to about 30 percent, by weight of said solution, of a primary aliphatic monoamine, sufficient solution being used so that an amount of monoamine at least equivalent to the imide-forming groups of the polymer being treated is present.

2. The method as in claim 1 wherein the reaction is performed at a pressure between about 8 atmospheres and about 40 atmospheres.

3. The method as in claim 1 wherein a homopolymer of methylmethacrylate is treated.

4. The method as in claim 1 wherein a copolymer of methylmethacrylate is treated.

5. The method as in claim 1 wherein said primary aliphatic monoamine is a lower alkyl amine.

6. The method as in claim 1 wherein said solution additionally contains up to 10 percent, by weight of said solution, of ammonia.

References Cited by the Examiner

UNITED STATES PATENTS

| | | | |
|---|---|---|---|
| 2,146,209 | 2/1939 | Graves | 260—72 |
| 2,801,985 | 8/1957 | Roth | 260—80.3 |
| 2,816,083 | 12/1957 | Shearer | 260—80.3 |
| 2,845,408 | 7/1958 | Melamed | 260—86.1 |
| 2,915,481 | 12/1959 | Ayers | 260—89.5 |
| 3,033,782 | 5/1962 | Rauch et al. | 260—89.5 |

FOREIGN PATENTS 818,249    8/1959    Great Britain.

JOSEPH L. SCHOFER, *Primary Examiner.*

H. WONG, *Assistant Examiner.*